United States Patent [19]
Williams

[11] 3,730,165
[45] May 1, 1973

[54] PORTABLE LIQUID HEATER AND FOOD WARMER

[76] Inventor: Garold H. Williams, 43 West 100 South, Smithfield, Utah 84335

[22] Filed: June 28, 1971

[21] Appl. No.: 157,490

[52] U.S. Cl. .................................. 126/266, 126/38
[51] Int. Cl. ............................................. F23c 1/00
[58] Field of Search ................... 126/266, 265, 261, 126/38

[56] References Cited

UNITED STATES PATENTS

| | | |
|---|---|---|
| 284,592 | 9/1883 | Banks et al. ........................... 126/266 |
| 1,260,798 | 3/1918 | Popper .................................. 126/38 |
| 2,973,756 | 3/1961 | Tylle ..................................... 126/266 |
| 784,215 | 3/1905 | Humphrey ............................. 126/266 |
| 3,608,538 | 9/1971 | Guerrero .............................. 126/266 |

Primary Examiner—William F. O'Dea
Assistant Examiner—Peter D. Ferguson
Attorney—B. Deon Criddle

[57] ABSTRACT

A portable heater and food warmer unit wherein water, coffee or other liquid and food can be simultaneously heated by a flame generated either from a gas fired burner or from a canned heat source. Surplus heat passed through a liquid heater is directed through an upstanding exhaust vent in a housing of the invention, on which a warming cup containing a food item to be heated can be positioned. The warming cup, when not in use, fits snugly over the top of the housing, and a pressurized cylinder, which may be used as a fuel source can be mounted on the side of the housing. The unit, fits in a carrying pouch which is attached to a belt worm around the hips of a camper or hiker like a conventional canteen.

1 Claim, 4 Drawing Figures

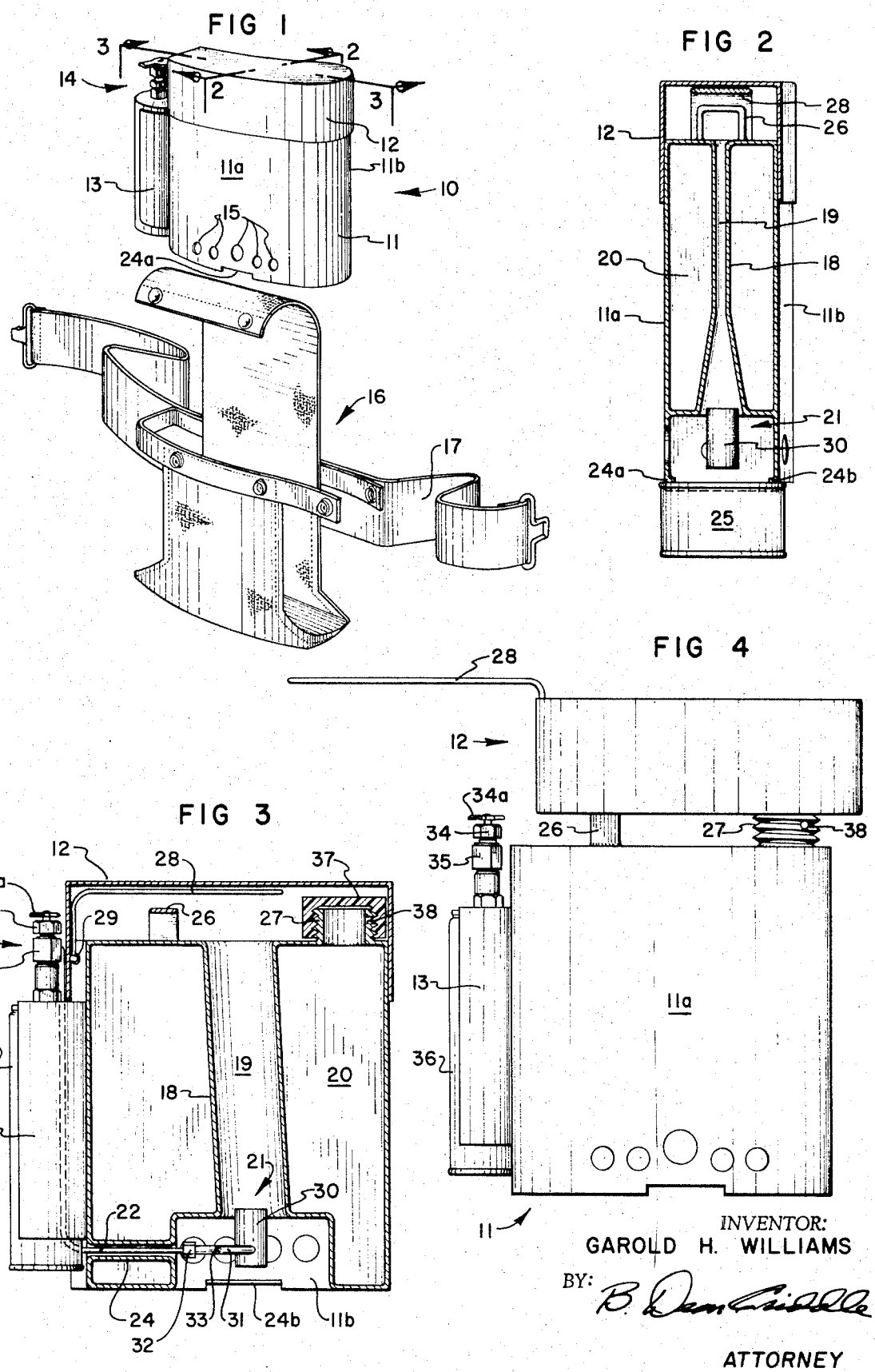

PORTABLE LIQUID HEATER AND FOOD WARMER

BRIEF DESCRIPTION OF THE INVENTION

1. Field of the Invention

This invention relates to devices for carrying and heating liquids and to food warmers and is particularly concerned with compact heating devices which can be conveniently carried by a hiker or camper.

2. Prior Art

Numerous devices have been proposed and used for the heating of liquids by outdoor enthusiasts. Such devices range from a kettle or pot used over an open fire, to portable instant hot water heater such as I have disclosed in my co-pending application for U.S. Pat., Ser. No. 14,045, filed Feb. 25, 1970 and now U.S. Pat. No. 3,687,128.

To my knowledge, prior to the present invention, there has not been available, or known, a unit suitable for carrying liquids and for heating both the liquid therein and food and which is small, compact and is designed to fit within a carrying pouch carried on a user's belt. While other known heating devices may be considered portable, in that they can be moved, the present invention can be transported more or less effortlessly by a hiker or camper even over long distances. Although compact enough to be carried effortlessly, the unit of the invention provides an efficient heat transfer to a liquid contained therein and it utilizes heat exhausted after heating of the liquid to warm food in a cup-like container.

SUMMARY OF THE INVENTION

The present invention provides a liquid and food heating device having overall dimensions such that it can be conveniently maintained in a carrying pouch suspended from the belt of a hiker, hunter, camper or other user.

Principal objects of the present invention are to provide a highly compact portable heating device wherein a stored liquid can be efficiently and quickly heated and on which food in a cup, or like container, can be heated.

Other objects are to provide a heating device which can conveniently utilize multiple types of fuel, either separately or together.

Another object is to include a cup or other suitable heating container which will telescope onto a housing of the heating device for storage and that will securely sit above a heat exhaust stack where the container and the contents thereof will be heated simultaneously with the heating of liquid in the housing.

Still another object is to provide a carrying pouch for the heating device, which pouch is adapted to be maintained on a belt surrounding a hiker or camper's waist.

To accomplish these objects, I utilize as principal features of my invention, a housing with a burner assembly mounted therebeneath such that heat generated at the burner is directed up through a central stack passage within the housing. The stack passage is of decreasing cross-sectional dimensions as it extends upwardly through the housing and the passage is surrounded by a reservoir formed within the housing.

Liquid is maintained within the reservoir by a lid which is screwed onto, snapped onto, or otherwise arranged to close a spout projecting from the top of the reservoir portion of the housing. The lid is removed to prevent pressure build up within the reservoir during heating of the liquid.

An inlet line to the burner assembly has a valve assembly connected therein. The valve assembly is mounted on the housing and is arranged to control flow of gas from the pressurized cylinder to the burner assembly. The gas cylinder is held in place within a recessed portion of an end wall of the housing by a holder means at the side of the device housing, which housing is contoured at this point to receive the said cylinder and mounting.

Appropriate notches are formed in the bottom portion of the housing to accommodate the top of a can of solid fuel. When the can of fuel is positioned within the notches with the can lid removed, and the can contents are ignited, the heat generated is directed past the burner assembly and into the exhaust passage. This arrangement provides for an alternate heating method should a pressurized gas cylinder not be available. In addition, both heat sources can be used simultaneously, if desired, to give even more rapid and more effective heating.

A cup having dimensions which allow it to be telescoped snugly over the top of the heating device has a folding handle to facilitate its use as either a drinking vessel or a cooking vessel. When the cup is used as a cooking vessel, food is placed in the cup and the cup is positioned above the top of the heat exhaust vent of the heating device. A platform is fixed to the top of the device to support one end of the cup and the other end of the cup rests on an upwardly projecting spout. When the cup is so positioned, exhaust heat passing through the vent acts on the bottom of the cup to heat the contents thereof.

Additional objects and features of the invention will become apparent from the following detailed description and drawings, disclosing what are presently contemplated as being the best modes of the invention.

THE DRAWINGS

In the drawings:

FIG. 1 is an exploded view of the heating device of the invention and its belt mounted carrying pouch;

FIG. 2, a vertical section view taken on the line 2—2 of FIG. 1 and showing the heating device positioned on a canned fuel heat source;

FIG. 3, a vertical sectional view taken along line 3—3 of FIG. 1; and

FIG. 4, a front elevation view of the heating device with the cup above the heat exhaust vent.

DETAILED DESCRIPTION

Referring now to the drawings:

In the illustrated preferred embodiment, the heating device shown generally at 10, includes a housing 11 and a cup 12 that telescopes snugly over the top of the housing. A gas cylinder mounting clip 13 having a valve assembly 14 at the top thereof is fixed to one side of housing 11. Holes 15 are formed in the spaced lower front walls 11a and rear walls 11b of housing 11 to provide means through which the air necessary to combustion can be admitted, as will be further explained. Rear wall 11b is preferably curved to conform to a users hip against which the heating device 10 may be suspended.

The heating device 10 is supported against a user's hip by a carrying pouch 16, of canvas or other suitable material, that is fixed to a belt 17 which will fit around the waist of a user.

As best shown in FIGS. 2 and 3, housing 11 has a partition 18 therein that divides the interior of the housing to form a central heat vent 19, surrounded by a reservoir 20.

As best seen in FIG. 2, the heat vent 19 is tapered from a greater cross-sectional dimension at its bottom to a smaller dimension near its top. As heat is directed upwardly through the heat vent, the decreasing cross section of the vent 19 slightly restricts the upward progress of the heat therein, thereby resulting in an efficient heat transfer through the partition 18 to liquid in reservoir 20. Cup 12 is removed from its position telescoped over the top of housing 11 prior to any heating.

An upwardly directed burner 21 is supported on one end of a gas supply line 22, beneath the vent 19. The other end of the supply line 22 is connected to the valve assembly 14 and the line extends through a side wall of housing 11 and through a tube 24 forming a sealed passageway through the reservoir 20. Thus, even in the event a leak should develop in line 22 no gas could escape into and contaminate the liquid in reservoir 20.

Notches 24a and 24b are formed in the lower edges of walls 11a and 11b, respectively and the notches are dimensioned and positioned such that they straddle the top of an opened can 25 of canned fuel and such that the heating device will balance on the can of fuel.

As shown in FIG. 3, heat vent 19 extends upwardly through housing 11 and has its upper outlet opening extending as a slot between a platform 26 and a spout 27. Thus, when cup 12 is positioned to have its bottom bridging the distance between platform 26 and spout 27 the bottom is directly above the outlet opening of the vent 19 where it is subjected to any heat conducted upwardly through the vent.

An L-shaped handle 28 rotates from a stored position within cup 12, about a hinge pin 29 on the wall of cup 12 as shown in FIG. 3, to a position as illustrated in FIG. 4 extending up and over the wall of cup 12. In the position of FIG. 4, the handle is readily available for use when the cup is serving as a cooking vessel.

The burner 21, shown best in FIG. 3, consists of an upstanding burner bowl 30 with an inlet conduit 31 extending tangentially thereinto. The line 22 transports gas from the valve assembly 14 to conduit 31 which is fixed to the line by a coupling 32. A Venturi air hole 33 in conduit 31 provides a means whereby outside air is entrained within gas being fed into the burner from the valve assembly.

Valve assembly 14 comprises a conventional screw type valve 34 having a threaded base that is screwed into a fitting 35 at the top of the gas cylinder mounting clip 13. Turning of screw 34a of valve 34 moves a hollow needle, (not shown) down within fitting 35, to puncture a self sealing cap of a gas cylinder 36 that is inserted upwardly into the fitting 35. Gas cylinder 36 is removably held within mounting clip 13 by the gripping action of the sides of the clip, which are resilient, but it should be apparent that other means could of course be employed to maintain the gas cylinder 36 in position.

In operation, the heating device 10 is removed from pouch 16, cup 12 is removed and handle 28 is rotated out of the cup. A cap 37 is unscrewed from spout 27 and the heating device 10 is either positioned on the can 25 of canned fuel or is positioned on an essentially level surface. If heat is to be provided by operation of the burner, screw 34a is turned to allow a gas flow from cylinder 36, through line 22 to burner bowl 30, wherein it is ignited by a match. Flame and heat from burner 21, in contact with partition 18, are directed upwardly through heat vent 19, thereby heating liquid in reservoir 20, and impinging upon the undersurface of cup 12 which rests on platform 26 and spout 27. A vent port 38 through the wall of spout 27, at the upper end thereof allows steam to escape from reservoir 20, even when cup 12 is resting on the spout so that no dangerous pressure build up will occur in the reservoir during heating of the liquid therein.

With the present invention, a user has a compact portable device wherein liquid can be transported and with which the liquid can be heated. Surplus heat from the liquid heating process can be used to heat the contents of a cup positioned above the heat exhaust of the device.

Although a preferred form of my invention has been herein described, it is to be understood that the present disclosure is made by way of example and that variations are possible without departing from the scope of the hereinafter claimed subject matter, which subject matter I regard as my invention.

I claim:

1. A portable liquid heater and food warmer comprising:

a housing having an interior and an exterior and an exhaust vent extending upwardly therethrough from a location above a bottom edge of the housing, and a reservoir formed to surround the vent;

a burner positioned within the housing and beneath the vent, said burner having an outlet aligned with the vent;

a pressurized gas container fixed to the exterior of said housing and having a gas line interconnecting the interior of the container and the burner and a control valve in the gas line, outside of said housing;

notches in the bottom edge of the housing and spaced from the vent such that when said notches are positioned on an open rim of a can of chemical fuel the said can is centrally positioned beneath the burner and the vent;

spout means providing access means to the reservoir;

means to vent the reservoir during heating thereof;

cup means constructed to closely telescope down over the top of the housing; and support means for cooperating with the spout when the cup means is bridged thereover to position a bottom of said cup means a spaced distance above the top of the vent, whereby the contents of the cup means are warmed by heat exiting from said vent.

* * * * *